106. COMPOSITIONS,
COATING OR PLASTIC.

92

UNITED STATES PATENT OFFICE.

JAMES THOMAS KEY, OF BLACKBURN, LOUISIANA.

ARTIFICIAL STONE.

SPECIFICATION forming part of Letters Patent No. 387,519, dated August 7, 1888.

Application filed May 21, 1888. Serial No. 274,524. (No specimens.)

*To all whom it may concern:*

Be it known that I, JAMES THOMAS KEY, of Blackburn, in the parish of Claiborne and State of Louisiana, have invented certain new and useful Improvements in Artificial Stone; and I do hereby declare the following to be a full, clear, and exact description of the invention, such as will enable others skilled in the art to which it pertains to make and use it.

My invention relates to an improvement in artificial stone; and the object of my invention is to produce an artificial stone which is adapted for building purposes and for all uses to which natural stone can be applied, and which, while in a plastic state, can be given any desired shape.

In making this stone I take Portland cement, forty-nine pounds; common sand, thirty-seven pounds; plaster-of-paris, five pounds; alum, three pounds; table-salt, two pounds; rice, four pounds.

The alum is dissolved in warm water, and the rice is thoroughly cooked and strained through a cloth. The cement and sand are mixed with the other ingredients, and they are all poured together and well mixed with water. The molds are filled with the composition and allowed to remain for a day, when the composition can be removed from the mold.

The rice is boiled until it is reduced to a thin mush, and when added to the compound renders it water-proof, gives it a whiter color, and enables the stone to take a high polish. Unless the stone be made water-proof, it absorbs moisture, and then cracks or breaks in cold weather from freezing. If the stone will not take a polish, it is not fit for building the finer classes of houses or to be used in making tombstones and articles of that class.

Having thus described my invention, I claim—

An artificial stone composed of Portland cement, sand, plaster-of-paris, alum, table-salt, and rice, in or about in the proportions specified.

In testimony whereof I affix my signature in presence of two witnesses.

JAMES THOMAS KEY.

Witnesses:
 W. F. BRIDGES,
 DREW FERGUSON.